United States Patent

Steadings et al.

[11] Patent Number: 5,816,582
[45] Date of Patent: Oct. 6, 1998

[54] CHUCK

[75] Inventors: Stephen W. Steadings; Christopher B. Barton, both of Seneca, S.C.

[73] Assignee: Power Tool Holders Incor., Wilmington, Del.

[21] Appl. No.: 755,848

[22] Filed: Dec. 6, 1996

Related U.S. Application Data

[63] Continuation of Ser. No. 514,515, Aug. 11, 1995, abandoned.

[51] Int. Cl.$^6$ .................................................. B23B 31/12
[52] U.S. Cl. ........................... 279/62; 279/140; 279/902
[58] Field of Search .......................... 279/60–65, 140, 279/902

[56] References Cited

U.S. PATENT DOCUMENTS

| 573,189 | 12/1896 | Vogel | 279/62 |
|---|---|---|---|
| 5,125,673 | 6/1992 | Huff et al. . | |
| 5,172,923 | 12/1992 | Nakamura | 279/140 |
| 5,234,223 | 8/1993 | Sakamaki | 279/902 |
| 5,322,303 | 6/1994 | Nakamura | 279/62 |
| 5,348,317 | 9/1994 | Steadings et al. | 279/62 |
| 5,431,419 | 7/1995 | Mack | 279/140 |
| 5,458,345 | 10/1995 | Amyot | 279/62 |
| 5,499,829 | 3/1996 | Rohm | 278/140 |
| 5,499,830 | 3/1996 | Schnizler . | |
| 5,615,899 | 4/1997 | Sakamaki | 279/62 |

FOREIGN PATENT DOCUMENTS

| 0618029A1 | 10/1994 | European Pat. Off. . |
|---|---|---|
| 0710518A2 | 4/1995 | European Pat. Off. . |
| 0710519A2 | 4/1995 | European Pat. Off. . |
| 0710520A2 | 4/1995 | European Pat. Off. . |
| 0677348A1 | 10/1995 | European Pat. Off. . |
| 4238503C1 | 11/1993 | Germany . |
| 19506708 | 3/1996 | Germany . |
| 29600727 U1 | 4/1996 | Germany . |
| 4438991A1 | 5/1996 | Germany . |
| 4365504 | 12/1992 | Japan . |

OTHER PUBLICATIONS

PCT International Search Report, 6 pages, Oct. 23, 1996.
Translation of DE 44 38 991 A1.
Translation of DE 195 06 708 C1.
Translation of EP 0 710 520 A2.
Translation of EP 0 710 519 A2.
Translation of EP 0 710 518 A2.
Translation of EP 0 618 029 A1.

*Primary Examiner*—Steven C. Bishop
*Attorney, Agent, or Firm*—Dority & Manning, P.A.

[57] ABSTRACT

Chuck for use with manual or powered driver having rotatable shaft, the chuck including a body member and jaws slidably positioned in angled passageways formed in the body. The chuck further includes a nut rotatably mounted relative to the body member and in engagement with threads on the jaws. A generally cylindrical front sleeve member is disposed in driving engagement with the nut and overlying the nose section of the body so that when the front sleeve member is rotated with respect to the body, the jaws will be moved thereby to grip the shaft of a tool. A spring member is biased to engage the sleeve member and is disposed selectively rotatably with respect to the nut. When the nut is tightened, the spring member becomes locked to the body member and restrains the nut from loosening during vibration of the chuck in use for its intended purpose.

33 Claims, 3 Drawing Sheets

5,816,582

CHUCK

This is a continuation of application Ser. No. 08/514,515, filed Aug. 11, 1995, which was abandoned upon the filing hereof.

BACKGROUND OF THE INVENTION

The present invention relates generally to chucks for use with drills or with electric or pneumatic power drivers. More particularly, the present invention relates to a chuck of the keyless type which may be tightened or loosened by hand or by actuation of the driver motor.

Both hand and electric or pneumatic tool drivers are well known. Although twist drills are the most common tools used with such drivers, the tools may also comprise screwdrivers, nut drivers, burrs, mounted grinding stones and other cutting or abrading tools. Since the tools may have shanks of varying diameter or the cross-section of the tool shank may be polygonal, the device is usually provided with a chuck which is adjustable over a relatively wide range. The chuck may be attached to the driver by a threaded or tapered bore.

A wide variety of chucks have been developed in the art. In the simplest form of chuck, three jaws spaced circumferentially approximately 120 degrees apart from each other are constrained by angularly disposed passageways in a body attached onto the drive shaft and configured so that rotation of the body in one direction with respect to a constrained nut engaging the jaws, forces the jaws into gripping relationship with the cylindrical shank of a tool, while rotation in the opposite direction releases the gripping relationship. Such a chuck may be keyless if it is rotated by hand. One example of such a chuck is disclosed in U.S. Pat. No. 5,125,673 entitled "Non-Impact Keyless Chuck" commonly assigned to the present assignee, and whose entire disclosure is incorporated herein by this reference.

Despite the success of keyless chucks such as set forth in U.S. Pat. No. 5,125,673, varying configurations of keyless chucks are desirable for a variety of applications. Of course, it would also be desirable to have a keyless chuck that requires fewer components and/or lower manufacturing cost.

In a conventional chuck used to secure a drill engaged in hammer drilling for example, the vibration that results from use of the tool, can cause the jaws to loosen their grip around the shaft of the tool. This can have undesirable consequences, both for the work piece and for the operation of the tool.

SUMMARY OF THE INVENTION

The present invention recognizes and addresses the foregoing considerations, and others of prior art constructions and methods.

Accordingly, it is an object of the present invention to provide an improved chuck wherein vibration during use does not cause the jaws to loosen their grip around the shaft of the tool.

It is also an object of the present invention to provide an improved keyless chuck.

It is another object of the present invention to provide a keyless chuck that allows for efficient tightening of the nut on the jaws during operation.

It is another object of the present invention to provide a keyless chuck that has a minimum number of individual components that must be assembled.

These and other objects are achieved by providing a chuck for use with a manual or power driver having a rotatable drive shaft, the chuck comprising a generally cylindrical body member having a nose section and a tail section. The tail section has an axial bore formed therein to mate with the drive shaft of the driver, and the nose section has an axial bore formed therein and a plurality of angularly disposed passageways formed therethrough and intersecting the axial bore. The chuck further includes a plurality of jaws slidably positioned in each of the angularly disposed passageways, each of the jaws having a jaw face formed on one side thereof and threads formed on the opposite side thereof. The chuck also includes a nut rotatably mounted with respect to the body member and in engagement with the threads on the jaws. The chuck also includes a generally cylindrical front sleeve member in driving engagement with the nut and overlying the nose section of the body member whereby when the front sleeve member is rotated with respect to the body member, the jaws will be moved thereby. The chuck further includes a spring member disposed selectively rotatably with respect to the nut. The front sleeve member can engage the spring member via at least one of a plurality of indentations configured in an inner surface of the sleeve member. The spring member can have at least one arm biased toward the front sleeve member, and this arm can have at least one boss configured to engage the front sleeve member. Thus, a restraining torque acts to prevent relative rotation between the spring member and the front sleeve (and the nut operatively connected to the front sleeve). The body member of the chuck can include a thrust receiving portion. The spring member can be disposed between the nut and the thrust receiving portion of the body member so that a rearward axial thrust locks the spring member nonrotatably relative to the body member when the nut is rotated to tighten the jaws about the shaft of the tool in the desired manner. The spring member can be rotatably disposed with respect to the nut by means of a bearing assembly disposed between the nut and the spring member. The bearing assembly can include a friction-reducing surface formed as a coating disposed on at least one of the spring member and the nut. Alternatively, the chuck can include a self-contained anti-friction bearing assembly disposed adjacent the thrust receiving portion.

Other objects, features and aspects of the present invention are discussed in greater detail below.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying figures, in which.

Figure 1:
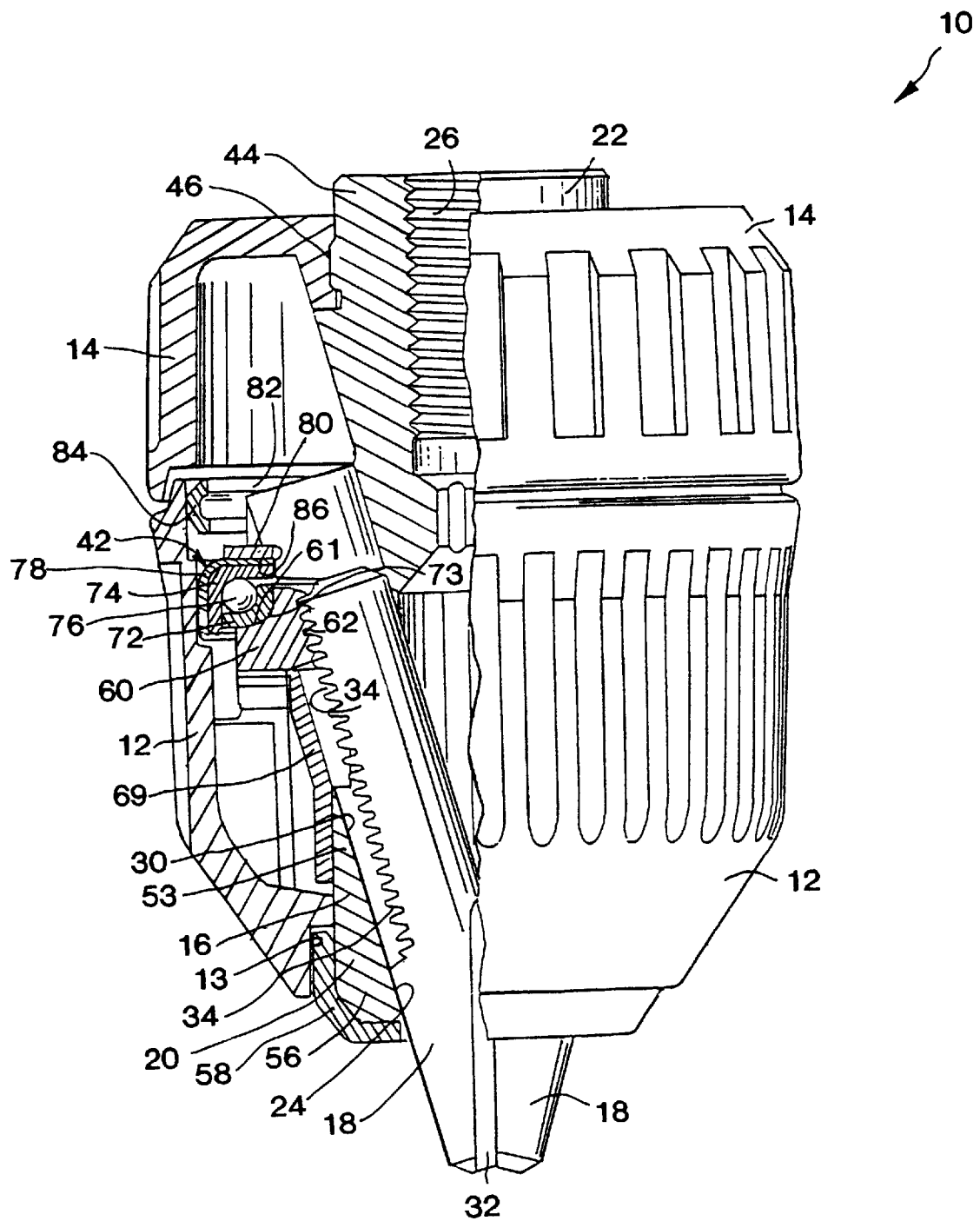
FIG. 1 is a front plan view, partly in section, of a chuck in accordance with an embodiment of the present invention.

Repeat use of reference characters in the present specification and drawings is intended to represent same or analogous features or elements of the invention.

DETAILED DESCRIPTION OF PREFERRED EMBODIMENTS

It is to be understood by one of ordinary skill in the art that the present discussion is a description of exemplary embodiments only, and is not intended as limiting the broader aspects of the present invention, which broader aspects are embodied in the exemplary construction.

Figure 2:
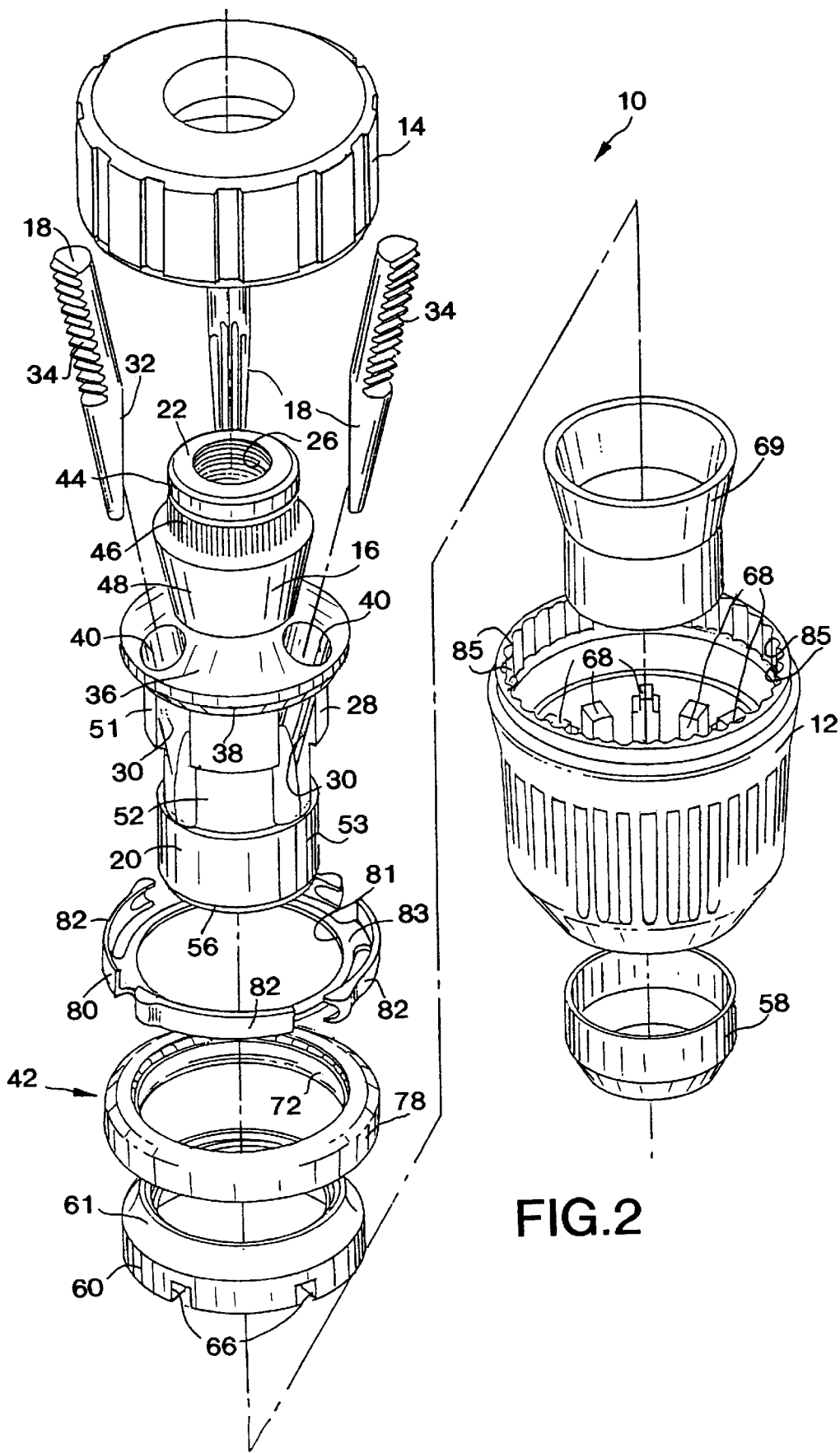
FIG. 2 is an elevated perspective assembly view of the chuck body and certain other parts illustrated in FIG. 1.

Referring to FIG. 1, a chuck 10 in accordance with the present invention is illustrated. Chuck 10 includes a front sleeve member 12, an optional rear sleeve member 14, a body member 16, and a plurality of jaws 18. Referring to FIGS. 1 and 2, body member 16 is generally cylindrical in shape and comprises a nose or forward section 20 and a tail or rearward section 22. As shown in FIG. 1, an axial bore 24 is formed in the nose section 20 of the body member 16. Axial bore 24 is somewhat larger than the largest tool shank that the chuck is designed to accommodate. A threaded bore 26 is formed in tail section 22 of body 16 and is of a standard size to mate with the drive shaft of a powered or hand driver (not shown). While a threaded bore 26 is illustrated, such bore could be replaced with a tapered bore of a standard size to mate with a tapered drive shaft. The bores 24, 26 may communicate at the central region 28 of body member 16.

A separate passageway 30 is formed in body member 16 to accommodate each jaw 18. A plurality of jaws 18 and corresponding passageways are provided. Referring to FIG. 1, when three jaws 18 are employed, each jaw 18 is separated from the adjacent jaw by an arc of approximately 120 degrees. The longitudinal axes of the passageways 30 and the jaws 18 are angled with respect to the longitudinal axis of the chuck but intersect the chuck axis at a common point ahead of the chuck body 16. Each jaw 18 has a tool engaging face 32, which is generally parallel to the longitudinal axis of the chuck body 16, and threads 34 on its opposite or outer surface. Threads 34 of any suitable type and pitch may be utilized within the scope of the present invention as would be readily apparent to one skilled in the art.

As illustrated in FIGS. 1 and 2, body member 16 includes a thrust ring member 36 which, in a preferred embodiment, is integral therewith and constitutes the thrust-receiving portion 36 of body member 16. Although not presently preferred, thrust ring member 36 may be a separate component from the body member. As shown in FIG. 1, thrust ring member 36 includes a ledge portion 38, which can be adapted for engagement with the shroud or outer race of a self-contained anti-friction bearing assembly 42 as will be described in more detail below. Thrust ring member 36 includes a plurality of jaw guideways 40 formed around the circumference in alignment with passageways 30 to permit movement (retraction and extension) of the jaws 18 through guideways 40.

Referring to FIGS. 1 and 2, tail section 22 of body member 16 can include a rear cylindrical portion 44 with a knurled surface 46 thereon for receipt of optional rear sleeve 14 to be pressed thereon if so desired. As shown in FIG. 2, body 16 further includes a first tapered portion 48 extending from rear cylindrical portion 44 to the region of thrust ring 36. A first central cylindrical portion 51 extends from the region of thrust ring 36 to a second central cylindrical portion 52 having a diameter less than first central cylindrical portion 51. A front cylindrical portion 53 extends from one end of second central cylindrical portion 52 to a beveled nose portion 56 that is adapted to receive a nosepiece 58 for maintaining the front sleeve 12 in driving engagement with a nut as will be set forth in more detail below. Alternatively, a snap ring or the like could be utilized to maintain the front sleeve 12 in place or the front sleeve 12 could be pressed on or otherwise secured to the nut (described below).

The present invention further includes a nut 60 rotatably mounted with respect to body member 16 and in engagement with threads 34 on jaws 18. As shown in FIG. 1, nut 60 includes threads 62 for mating with threads 34 on jaws 18 whereby when nut 60 is rotated with respect to body 16, the jaws 18 will be advanced or retracted in a particular direction along the longitudinal axis of the passageways 30. This direction has a component along the longitudinal axis of the body member 16. As shown in FIG. 2, nut 60 may include drive slots 66 for mating with drive ribs 68 on front sleeve 12. In this way nut 60 is keyed to front sleeve 12 so that when front sleeve 12 is rotated, nut 60 will rotate therewith and move jaws 18 as set forth above. In a preferred embodiment, nut 60 is configured in the form of a one piece nut, but could be formed in two or more pieces that could be joined together or merely concentrically disposed.

As shown in FIG. 1, a nut retainer member 69 is configured and disposed so as to cooperate with front cylindrical portion 53 of body member 16 in a manner that retains nut 60 from moving axially toward nose section 20 of body member 16. As shown in FIG. 2, nut retainer 69 is generally configured with a cylindrically shaped section joined to a section shaped in a truncated conical form.

Figure 3:
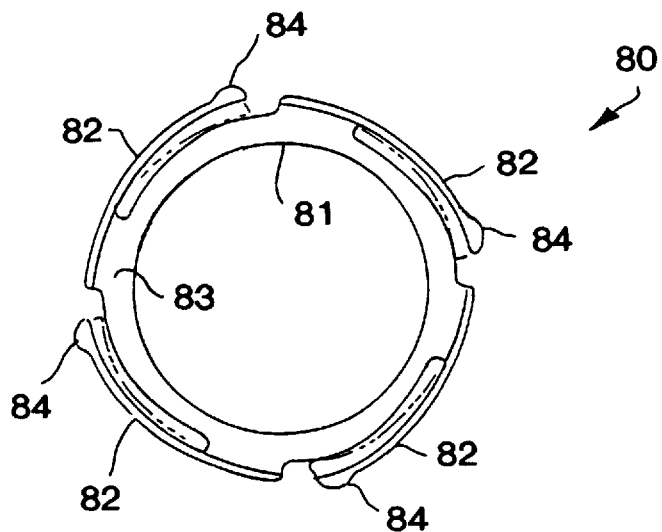
FIG. 3 is a detailed enlarged top plan view of a component in accordance with an embodiment of the present invention.

In further accordance with the present invention, a spring member is provided. As shown in FIGS. 1 and 2, a spring member 80 is configured and disposed about body member 16. As shown in FIGS. 2 and 3, an inner surface of an annular ring portion 83 of spring member 80 defines a centrally disposed opening 81 that permits spring member 80 to be disposed about body member 16. As shown in FIGS. 1 and 2, annular ring portion 83 of spring member is configured and disposed to rest against ledge 38 of thrust ring 36, and the diameter of opening 81 is large enough so as not to impede movement of jaws 18 through guideways 40 in thrust ring 36 of body member 16.

Figure 4:
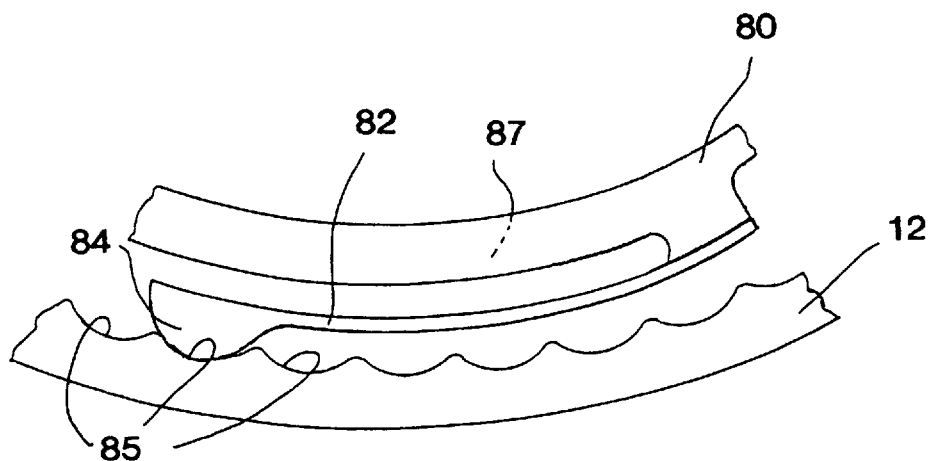
FIG. 4 is a partial top plan view of the component of FIG. 3 engaging the sleeve member as in FIG. 1.

As shown in FIGS. 1 and 4, spring member 80 includes at least one arm 82 resiliently biased toward front sleeve member 12 and carrying on the free end of arm 82 at least one boss 84 configured to engage front sleeve member 16. As shown in FIG. 4, a plurality of indentations 85 are configured and disposed in an inner surface near the rear edge of front sleeve member 16 so as to engage and receive the corresponding boss 84 disposed at the free end of arm 82 of spring member 80. As shown in FIGS. 2 and 3, spring member 80 has a plurality of arms 82 and associated bosses 84, four being shown symmetrically disposed circumferentially around the outer periphery of spring member 80.

As schematically denoted by the dashed outline of arms 84 in FIG. 3, each arm 82 resiliently deflects radially (in a general sense) inwardly toward the center of opening 81 and radially (again in a general sense) outwardly away from opening 81. In this way, arms 82, bosses 84 and indentations 85 are configured so that a circumferential force is needed to overcome the engagement. Thus, the engagement between indentations 85 and corresponding received bosses 84 provides a restraining torque. So long as this engagement does not slip during manual movement of nut 60 by rotation of sleeve member 12, then front sleeve member 12, nut 60 and spring member 80 rotate in unison rather than relative to one another.

As nut 60 is rotated so that jaws 18 are increasing the forward gripping force applied to the shaft of a tool, a corresponding axial force is increasingly exerted rearwardly through jaws 18 to nut 60. This rearward axial force is transmitted through nut 60 to body member 16, and particularly to ledge 38 of thrust ring 36 of body member 16. Moreover, as shown in FIGS. 1 and 2, spring member 80 is disposed between nut 60 and thrust-receiving portion 36 of body member 16. More specifically, annular ring portion 83 of spring member 80 provides the vehicle for transmitting the axial force rearwardly from nut 60 to ledge 38 of thrust ring 36 of body member 16. Accordingly, this rearward axial force results in a frictional force between ledge 38 of thrust ring 36 of body member 16 and annular ring portion 83 of spring member 80.

This resulting frictional force between ledge 38 of thrust ring 36 of body member 16 and annular ring portion 83 of spring member 80 is directed circumferentially in a direction opposite to the direction that front sleeve 12 and nut 60 are being manually rotated by the user. Accordingly, this resulting frictional force acts to restrain circumferential movement of spring member 80 with respect to thrust ring 36 of body member 16. Thus, when the jaws 18 are tightened around the shaft of a tool in the desired manner, the resulting frictional force prevents further rotation of spring member 80 with respect to body member 16. In this manner, spring member 80 becomes locked to body member 16 and therefore becomes selectively disposed nonrotatably with respect to body member 16.

In a conventional chuck used to secure a drill engaged in hammer drilling for example, the vibration that results from use of the tool tends to cause the nut and front sleeve member to move in the direction of least resistance and, therefore, to cause the jaws 18 to loosen (i.e., release) their grip around the shaft of the tool. However, in accordance with the chuck of the present invention, the tension in the resilient arm 82 of spring member 80 and the configuration of bosses 84 in relation to the configuration of indentations 85, can be controlled to produce a restraining torque that counteracts such release torque. Thus, before front sleeve 12 can rotate with respect to spring member 80 (and with respect to body member 16 secured to spring member 80 by the aforementioned rearwardly acting axial force), the magnitude of the release torque allowed by the vibrations acting on the chuck must exceed the restraining torque that prevents spring member 80 from rotating relative to front sleeve member 12. The desired magnitude of this restraining torque is such as to prevent such vibrations from causing front sleeve member 12 (and nut 60 keyed thereto by the interaction of drive slots 66 and drive ribs 68) to rotate relative to body member 16. This ensures that jaws 18 do not loosen their desired grip around the tool shaft during such vibration of the tool when in use for its intended purpose such as hammer drilling or any other application that involves vibrations. Upon application of a torque to the front sleeve member 12 that exceeds the restraining torque, then the front sleeve member 12 and the nut 60 keyed thereto will be selectively rendered rotatable with respect to the spring member 80, which will be fixed nonrotatably to the body member 16 by means of the frictional restraining force resulting from the rearwardly applied axial thrust that pins annular ring portion 83 of spring member 80 against the thrust-receiving portion 36 of body member 16.

As noted above, spring member 80 is rotatably disposed with respect to nut 60. This is desirably accomplished by means of a bearing assembly disposed between the nut and the spring member. In one alternative embodiment, the bearing assembly includes a surface bearing between one surface of nut 60 and one surface of spring member 80. As shown in FIG. 1, a forwardly disposed surface 86 of annular ring portion 83 of spring member 80 is disposed to face a rearwardly facing surface 61 of nut 60. In the view shown in FIGS. 2–4, the opposite surface of annular ring portion 83 than the surface of ring portion 83 actually shown in these Figs., is one of the surfaces that would be disposed to bear against the rearwardly facing, i.e., lower, surface 61 of nut 60 in this surface bearing embodiment.

Desirably, at least one friction-reducing composition would be disposed between the opposed surfaces of nut 60 and spring member 80 disposed in this surface bearing relationship. The at least one friction-reducing composition can be deployed as a coating or layer of solid film lubricant that is applied by being sprayed on one of the bearing surfaces of nut 60 and then cured thereon. In an alternative embodiment, the components with the surfaces may be dipped or spray tumbled. A composition suitable for the friction-reducing composition is the PERMA-SLIK® lubricant distributed by E/M Corporation of West Lafayette, Ind. The PERMA-SLIK® lubricant can be applied to each desired surface according to the instructions provided by the manufacturer. Applicants believe that a preferred cured film thickness for each such layer of the solid film lubricant is between 0.0001 and 0.0005 inches. Further details concerning solid film lubricants can be learned from commonly assigned co-pending application Ser. No. 08/472,253, which is hereby incorporated herein by reference.

Referring to FIGS. 1 and 2, an alternative embodiment of the bearing assembly disposed between nut 60 and spring member 80 can include a self-contained bearing assembly, generally designated by the numeral 42. As shown in FIG. 1, self-contained bearing assembly 42 includes an inner race 72, an outer race 74 and bearing elements 76 maintained therebetween. In a preferred embodiment, bearing elements 76 are ball bearings. Self-contained bearing assembly 42 may further include a shroud 78 surrounding the inner and outer races 72, 74 for maintaining the bearing assembly as a self-contained component. As shown in FIG. 1, inner race 72 includes an arcuate surface 73 that is dimensioned and configured to mate with a corresponding rearwardly-facing arcuate seating surface 61 formed as part of nut 60. Nut 60 is received for support on inner race 72 and is not in frictional contact with body 16 as in some prior art devices. Such mating relationship assists in alignment and minimization of both axial and radial stresses when the chuck is operated, as well as minimizing or eliminating frictional contact or rubbing between nut 60 and body 16. Further, such a relationship assists in maintaining the nut centered during tightening so as to provide more even tightening of the chuck and reducing run-out. This arrangement also maintains optimum thread engagement with each jaw, further increasing efficiency and reducing stress in both jaw and nut threads. In a preferred embodiment, self-contained bearing assembly 42 is an angular thrust bearing.

In a preferred embodiment as set forth above, front sleeve member 12 is adapted to be loosely fitted over nose section 20 of chuck 10. Multiple drive ribs 68 of front sleeve 12 engage drive slots 66 of nut 60 so that front sleeve 12 and nut 60 will be operatively connected or keyed together, i.e., when front sleeve 12 is rotated, nut 60 will rotate therewith. As shown in FIG. 1, front sleeve 12 may include an annular ledge portion 13 disposed about nose section 20 of body member 16. A nosepiece 58 is dimensioned and adapted to be pressed onto beveled nose portion 56 of nose section 20 to maintain front sleeve 12 on chuck 10. It should be appreciated that nosepiece 58 could also be secured to body 16 by snap fitting, threading or the like. Nosepiece 58 is exposed when the chuck is assembled and, in one embodiment, may be coated with a non-ferrous metallic coating to prevent rust and to enhance its appearance. Examples of suitable coatings include zinc or nickel, however, it should be appreciated that any suitable coating could be utilized.

Nosepiece 58 serves to maintain front sleeve member 12 in position on chuck 10 and in driving engagement with nut 60. Further, while a nosepiece and driving slot arrangement is illustrated, it should be appreciated that any suitable method of operative connection between the front sleeve and the nut could be utilized within the scope of the present invention.

In addition, nosepiece 58 serves the dual purpose of providing an aesthetically pleasing cover for nose portion 56 that will resist rust. This provides the advantage of an aesthetically pleasing appearance without the necessity to coat the entire body member 16. If desired, the rear sleeve member 14 may be omitted and the front sleeve member 12 extended to the tail end of body 16. This alternative is particularly feasible when a spindle lock or the like is provided on the driver or when the driver is used to tighten or loosen the jaws.

The exterior circumferential surface of the front sleeve member 12 may be knurled or may be provided with longitudinal ribs or other protrusions to enable the operator to grip it securely. In like manner, the outer circumferential surface of the rear sleeve member 14, if employed, may be knurled or ribbed if desired. The front and rear sleeves may be fabricated from a structural plastic such as polycarbonate, a filled polypropylene, for example, glass filled polypropylene, or a blend of structural plastic materials. Other composite materials such as, for example, graphite filled polymerics also would be suitable in certain environments. As will be appreciated by one skilled in the art, the materials from which the chuck of the present invention is fabricated will depend on the end use of the chuck, and the above are provided by way of example only.

It will be appreciated that rear sleeve member 14 is fixed to body member 16, while front sleeve member 12 is operatively associated with nut 60 and rotatable with respect to body member 16. Because of the interaction between threads 34 on jaws 18 and threads 62 on nut 60, relative movement of the front and rear sleeve members, 12 and 14, causes jaws 18 to be advanced or retracted, depending upon the direction of relative movement.

While the above description is set forth with respect to a keyless chuck, it should be appreciated that the principles of the present invention are equally applicable to a keyed chuck, and such is within the scope of the present invention.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to be limitative of the invention so further described in such appended claims.

What is claimed is:

1. A chuck for use with a manual or powered driver having a rotatable drive shaft, said chuck comprising:
   a) a generally cylindrical body member having a nose section and a tail section, said tail section having an axial bore formed therein to mate with the drive shaft of the driver, said nose section having an axial bore formed therein and a plurality of angularly disposed passageways formed therethrough and intersecting said axial bore of said nose section;
   b) a plurality of jaws, a separate one of said jaws being slidably positioned in one of each of said angularly disposed passageways, each of said jaws having a jaw face formed on one side thereof and threads formed on the opposite side thereof;
   c) a generally cylindrical front sleeve assembly rotatable mounted about said nose section and in engagement with said threads on said jaws whereby when said front sleeve assembly is rotated with respect to said body member, said jaws will be moved thereby; and
   d) a spring member disposed in association with one of said front sleeve assembly and said body member so that said spring member rotates therewith, said spring member being configured to rotationally lock to the other of said front sleeve assembly and said body member and, when so locked, to resist rotation of said one of said front sleeve assembly and said body member, said one of said front sleeve assembly and said body member being configured to rotate with respect to said spring member, when said spring member is locked, upon application of sufficient torque to said one of said front sleeve assembly and said body member to overcome said resistance of said spring member.

2. A chuck for use with a manual or powered driver as stated in claim 1 and further including a rear sleeve member secured to said tail section of said body member.

3. A chuck for use with a manual or powered drive as stated in claim 1, wherein said front sleeve assembly is maintained on said body member and in engagement with said nut by a rust resistant nosepiece.

4. A chuck for use with a manual or powered driver as stated in claim 1, wherein said spring member is disposed in association with said one of said front sleeve assembly and said body member so that said spring member rotates therewith when said jaws are freely movable in a forward direction and wherein said spring member is configured to rotationally lock to the other of said front sleeve assembly and said body member when forward movement of said jaws is resisted by a tool shaft gripped by said jaws.

5. A chuck for use with a manual or powered driver as stated in claim 1, wherein said spring member is disposed in association with said front sleeve assembly so that said spring member rotates with said front sleeve assembly about said body member when said jaws are freely movable in a forward direction and wherein said spring member is configured to rotationally lock to said body member when forward movement of said jaws is resisted by a tool shaft gripped by said jaws, said spring member being configured to resist rotation of said front sleeve assembly when said spring member is locked to said body member and said front sleeve member being configured to rotate with respect to said spring member upon application of sufficient torque to said front sleeve member to overcome said resistance of said spring member.

6. A chuck for use with a manual or powered driver as stated in claim 4, wherein said front sleeve assembly engages said spring member by at least one of a plurality of indentations configured in an inner surface of said sleeve assembly.

7. A chuck for use with a manual or powered driver as stated in claim 6, wherein said spring member includes at least one arm having at least one boss configured to be received in at least one of said plurality of indentations configured in said sleeve assembly.

8. A chuck for use with a manual or powered driver as stated in claim 5, wherein said spring member has at least one arm biased toward said front sleeve assembly, said at least one arm having at least one boss configured to engage said front sleeve assembly.

9. A chuck for use with a manual or powered driver as stated in claim 1, wherein said front sleeve assembly includes a nut rotatably mounted with respect to said body member and in engagement with said threads on said jaws, and a generally cylindrical front sleeve member disposed in driving engagement with said nut.

10. A chuck for use with a manual or powered driver as stated in claim 9, wherein said nut is a one piece nut.

11. A chuck for use with a manual or powered driver as stated in claim 9, wherein said nut includes drive slots for receipt of drive ribs on said front sleeve member.

12. A chuck for use with a manual or powered driver having a rotatable drive shaft, said chuck comprising:
   a) a generally cylindrical body member having a nose section and a tail section, said tail section having an axial bore formed therein to mate with the drive shaft of the driver, said nose section having an axial bore formed therein and a plurality of angularly disposed passageways formed therethrough and intersecting said axial bore of said nose section, said body member including a thrust receiving section;
   b) a plurality of jaws, a separate one of said jaws being slidably positioned in one of each of said angularly disposed passageways, each of said jaws having a jaw face formed on one side thereof and threads formed on the opposite side thereof;
   c) a nut rotatably mounted with respect to said body member and in engagement with said threads on said jaws;
   d) a spring member disposed selectively rotatably with respect to said nut, wherein said spring member is rotatably disposed with respect to said nut by means of a bearing assembly disposed between said nut and said spring member; and
   e) a generally cylindrical front sleeve member engaging said spring member, said sleeve member being configured and disposed in driving engagement with said nut and overlying said nose section of said body member whereby when said front sleeve member is rotated with respect to said body member, said jaws will be moved thereby.

13. A chuck for use with a manual or powered driver as stated in claim 12, wherein said bearing assembly includes at least one friction-reducing surface disposed between said nut and said spring member.

14. A chuck for use with a manual or powered driver as stated in claim 13, wherein said at least one friction-reducing surface is formed as a coating disposed on at least one of said spring member and said nut.

15. A chuck for use with a manual or powered driver as stated in claim 12, wherein said bearing assembly is a self-contained bearing assembly including an inner race, an outer race, and bearing elements maintained between said races.

16. A chuck for use with a manual or powered driver as stated in claim 15, wherein said bearing elements are ball bearings.

17. A chuck for use with a manual or powered driver as stated in claim 15, wherein said self-contained bearing assembly includes a shroud at least partially surrounding said inner and outer races for maintaining said bearing assembly self-contained.

18. A chuck for use with a manual or powered driver as stated in claim 17, wherein said body member includes a thrust receiving portion disposed adjacent said shroud of said self-contained bearing assembly.

19. A chuck for use with a manual or powered driver as stated in claim 18, wherein said thrust receiving portion is unitary with said body member.

20. A chuck for use with a manual or powered driver as stated in claim 18, wherein said thrust receiving portion includes a ledge portion and wherein said self-contained bearing assembly is received on said ledge portion.

21. A chuck for use with a manual or powered driver as stated in claim 15, wherein each of said nut and said inner race includes a corresponding arcuate seating surface for mating with one another.

22. A chuck for use with a manual or powered driver as stated in claim 12, wherein said bearing assembly is an angular thrust bearing.

23. A chuck for holding the shaft of a tool to be used with a manual or powered driver having a rotatable drive shaft, said chuck comprising:
   a) a generally cylindrical body member having a nose section and a tail section, said tail section having an axial bore formed therein to mate with the drive shaft of the driver, said nose section having an axial bore formed therein and a plurality of angularly disposed passageways formed therethrough and intersecting said axial bore of said nose section;
   b) a plurality of jaws, a separate one of said jaws being slidably positioned in one of each of said angularly disposed passageways, each of said jaws having a jaw face formed on one side thereof and threads formed on the opposite side thereof;
   c) a thrust receiving portion fixed on said body member;
   d) a self-contained anti-friction bearing assembly disposed adjacent said thrust receiving portion;
   e) a nut rotatably mounted on said bearing assembly and in engagement with said threads on said jaws;
   f) a generally cylindrical front sleeve member configured and disposed in driving engagement with said nut and overlying said nose section of said body member whereby when said front sleeve member is rotated with respect to said body member, said jaws will be moved thereby; and
   g) a spring member configured and disposed about said body member such that when said jaws are desirably gripping the shaft of the tool, said spring member becomes locked to said body member and a predetermined restraining torque must be overcome before said nut can rotate with respect to said body member.

24. A chuck for use with a manual or powered driver having a rotatable drive shaft, said chuck comprising:
   a) a generally cylindrical body member having a nose section and a tail section, said tail section having an axial bore formed therein to mate with the drive shaft of the driver, said nose section having an axial bore formed therein and a plurality of angularly disposed passageways formed therethrough and intersecting said axial bore of said nose section;
   b) a plurality of jaws, a separate one of said jaws being slidably positioned in one of each of said angularly disposed passageways, each of said jaws having a jaw face formed on one side thereof and threads formed on the opposite side thereof;
   c) a generally cylindrical front sleeve assembly rotatably mounted about said nose section and in engagement with said threads on said jaws whereby when said front sleeve assembly is rotated with respect to said body member, said jaws will be moved thereby;

d) a thrust receiving member secured to said body member in at least a rearward axial direction and adjacent said front sleeve assembly, said thrust receiving member being configured to receive rearward axial thrust from said front sleeve assembly when forward movement of said jaws is resisted by a tool shaft gripped by said jaws and to convey said rearward axial thrust to said body member; and e) a spring member disposed between said front sleeve assembly and said thrust receiving member so that said spring member is rotationally locked to one of said front sleeve assembly and said thrust receiving member by said rearward axial thrust, said spring member being biased against the other of said front sleeve assembly and said body member so that said spring member is rotated therewith absent said rearward axial thrust.

25. A chuck for use with a manual or powered driver as stated in claim 24, wherein said spring member is disposed between said front sleeve assembly and said thrust receiving member so that said spring member is rotationally locked to said thrust receiving member by said rearward axial thrust and wherein said spring member is biased against said front sleeve assembly so that said spring member is rotated with said front sleeve assembly absent said rearward axial thrust.

26. A chuck for use with a manual or powered driver as stated in claim 24, wherein said thrust receiving member is unitary with said body member.

27. A chuck for use with a manual or powered driver as stated in claim 24, wherein said front sleeve assembly includes a nut rotatably mounted with respect to said body member and in engagement with said threads on said jaws, and a generally cylindrical front sleeve member rotatably disposed with respect to said spring member and disposed in driving engagement with said nut.

28. A chuck for use with a manual or powered driver having a rotatable drive shaft, said chuck comprising:

a) a generally cylindrical body member having a nose section and a tail section, said tail section having an axial bore formed therein to mate with the drive shaft of the driver, said nose section having an axial bore formed therein and a plurality of angularly disposed passageways formed therethrough and intersecting said axial bore of said nose section, said body member including a thrust receiving portion;

b) a plurality of jaws, a separate one of said jaws being slidably positioned in one of each of said angularly disposed passageways, each of said jaws having a jaw face formed on one side thereof and threads formed on the opposite side thereof;

c) a generally cylindrical front sleeve assembly rotatably mounted about said nose section and in engagement with said threads on said jaws whereby when said front sleeve assembly is rotated with respect to said body member, said jaws will be moved thereby; and d) an annular spring member disposed about said body member in association with said front sleeve assembly so that said annular spring member rotates with said front sleeve assembly about said body member when said jaws are freely movable in a forward direction, said annular spring member being configured to rotationally lock to said body member when forward movement of said jaws is resisted by a tool shaft gripped by said jaws.

29. A chuck for use with a manual or powered driver as stated in claim 28, wherein said annular spring is biased against said front sleeve assembly so that rotation of said front sleeve assembly urges rotation of said annular spring, and so that, upon locking of said annular spring to said body member, said annular spring resists rotation of said front sleeve assembly with respect to said body member.

30. A chuck for use with a manual or powered driver as stated in claim 28, wherein said front sleeve assembly includes a nut rotatably mounted with respect to said body member and in engagement with said threads on said jaws, and a generally cylindrical front sleeve member rotatably disposed with respect to said spring member and disposed in driving engagement with said nut.

31. A chuck for use with a manual or powered driver having a rotatable drive shaft, said chuck comprising:

a) a generally cylindrical body member having a nose section and a tail section, said tail section having an axial bore formed therein to mate with the drive shaft of the driver, said nose section having an axial bore formed therein and a plurality of angularly disposed passageways formed therethrough and intersecting said axial bore of said nose section, said body member including a thrust receiving portion;

b) a plurality of jaws, a separate one of said jaws being slidably positioned in one of each of said angularly disposed passageways, each of said jaws having a jaw face formed on one side thereof and threads formed on the opposite side thereof;

c) a generally cylindrical front sleeve assembly rotatably mounted about said nose section and in engagement with said threads on said jaws whereby when said front sleeve assembly is rotated with respect to said body member, said jaws will be moved thereby; and d) a spring member disposed about said body member and including an annular portion disposed between said front sleeve assembly and said thrust receiving portion so that said spring member is rotationally locked to said thrust receiving portion by rearward axial thrust from said front sleeve assembly when forward movement of said jaws is resisted by a tool shaft desirably gripped by said jaws, and at least one arm attached to said annular portion and biased against said sleeve assembly so that said spring member rotates with said front sleeve assembly about said body when said jaws are freely movable in a forward direction and resists rotation of said front sleeve assembly when said spring member is rotationally locked to said thrust receiving portion so that sufficient torque must be applied to said front sleeve assembly to overcome said resistance in order to rotate said front sleeve assembly with respect to said spring member.

32. A chuck for use with a manual or powered driver as stated in claim 31, wherein said front sleeve assembly includes a nut rotatably mounted with respect to said body member and in engagement with said threads on said jaws, and a generally cylindrical front sleeve member rotatably disposed with respect to said spring member and disposed in driving engagement with said nut.

33. A chuck for use with a manual or powered driver as stated in claim 32, wherein said front sleeve member engages said arm by at least one of a plurality of indentations configured in an inner surface of said sleeve member.

* * * * *

UNITED STATES PATENT AND TRADEMARK OFFICE
CERTIFICATE OF CORRECTION

PATENT NO. : 5,816,582
DATED : October 6, 1998
INVENTOR(S) : Stephen W. Steadings et al.

It is certified that error appears in the above-indentified patent and that said Letters Patent is hereby corrected as shown below:

In the claims

In Column 8, Line 26, please change "1" to --9--.

Signed and Sealed this

Fourteenth Day of March, 2000

Attest:

Attesting Officer

Q. TODD DICKINSON

Commissioner of Patents and Trademarks